(12) United States Patent
Zhu et al.

(10) Patent No.: US 12,264,973 B1
(45) Date of Patent: Apr. 1, 2025

(54) TEMPERATURE PROBE

(71) Applicant: SHENZHEN KUKI ELECTRONIC CO., LTD., Guangdong (CN)

(72) Inventors: Rongyuan Zhu, Guangdong (CN); Guo Qu, Guangdong (CN); Donghai Mei, Guangdong (CN)

(73) Assignee: SHENZHEN KUKI ELECTRONIC CO., LTD., Guangdong (CN)

( * ) Notice: Subject to any disclaimer, the term of this patent is extended or adjusted under 35 U.S.C. 154(b) by 0 days.

(21) Appl. No.: 18/636,369

(22) Filed: Apr. 16, 2024

(30) Foreign Application Priority Data

Dec. 19, 2023 (CN) .......................... 202311758875.3

(51) Int. Cl.
*G01K 1/14* (2021.01)
*G01K 1/024* (2021.01)

(52) U.S. Cl.
CPC .............. *G01K 1/024* (2013.01); *G01K 1/14* (2013.01); *G01K 2207/06* (2013.01)

(58) Field of Classification Search
CPC ....... G01K 1/024; G01K 1/14; G01K 2207/06
See application file for complete search history.

(56) References Cited

U.S. PATENT DOCUMENTS

| | | | | |
|---|---|---|---|---|
| 3,147,457 A | * | 9/1964 | Gill | G01K 1/16 374/E1.021 |
| 10,928,253 B2 | * | 2/2021 | Chu | G01K 13/00 |
| 11,378,462 B2 | * | 7/2022 | Wu | G01K 1/08 |
| 2013/0182745 A1 | * | 7/2013 | Hertel | G01K 7/16 374/185 |
| 2016/0377490 A1 | * | 12/2016 | Nivala | G01K 7/42 374/155 |
| 2019/0339133 A1 | * | 11/2019 | Pulvermacher | G01K 1/022 |
| 2021/0172805 A1 | * | 6/2021 | Cadima | F16B 2/10 |
| 2022/0333997 A1 | * | 10/2022 | Newhouse | G01K 1/024 |
| 2023/0086509 A1 | | 3/2023 | Guo et al. | |
| 2023/0194362 A1 | * | 6/2023 | Stein | G01K 1/14 374/141 |

FOREIGN PATENT DOCUMENTS

| | | | | |
|---|---|---|---|---|
| CN | 207384245 U | * | 5/2018 | |
| CN | 209332033 U | * | 9/2019 | ............ A61B 5/015 |
| CN | 115962866 A | | 4/2023 | |
| CN | 220122100 U | | 12/2023 | |

(Continued)

OTHER PUBLICATIONS

18636369_2024-06-11_CN_207384245_U_H.pdf, May 22, 2018.*

(Continued)

*Primary Examiner* — Gail Kaplan Verbitsky
(74) *Attorney, Agent, or Firm* — Cooper Legal Group, LLC

(57) ABSTRACT

A temperature probe includes a probe tube, a handle, a PCB, a rechargeable battery and a wireless charging coil, the handle is connected to the probe tube in a sealing manner, the handle is configured with a first inner cavity, the probe tube is configured with a second inner cavity in communication with the first inner cavity, the rechargeable battery is electrically connected to the PCB, the PCB is arranged in the second inner cavity, and the wireless charging coil is arranged in the first inner cavity and is electrically connected to the PCB, so as to charge the rechargeable battery.

9 Claims, 9 Drawing Sheets

(56) References Cited

FOREIGN PATENT DOCUMENTS

KR       20200112298 A  * 10/2020
WO    WO-2025012354 A1 *  1/2025

OTHER PUBLICATIONS

18636369_2024-06-11_CN_209332033_U_H.pdf,Sep. 3, 2019.*
18636369_2024-06-11_KR_20200112298_A_H.pdf,Oct. 5, 2020.*
18636369_2025-02-04_WO_2025012354_A1_H.pdf,Jan. 16, 2025.*
Office Action received in corresponding Great Britain patent application No. 2404984.3, dated Sep. 2, 2024, 5 pages.

* cited by examiner

TEMPERATURE PROBE

CROSS-REFERENCE TO RELATED APPLICATION

This application claims the priority and benefit of Chinese patent application serial no. 202311758875.3, filed on Dec. 19, 2023. The entirety of Chinese patent application serial no. 202311758875.3 is hereby incorporated by reference herein and made a part of this specification

TECHNICAL FIELD

The application relates to the technical field of temperature measuring devices, and in particular, to a temperature probe.

STATE OF THE ART

A Bluetooth temperature probe can be inserted into the food to measure the temperature directly, which allows the temperature data within the food to be viewed by users in real time and can support the intelligent cooking. Therefore, Bluetooth temperature probes are increasingly used. Existing Bluetooth temperature probe generally includes a probe tube, a handle, a temperature sensor, a PCB, a Bluetooth module, an antenna and a power supply module.

In patent application CN220122100U with the name of "a new Bluetooth temperature probe", the power supply module is a rechargeable battery that needs to be frequently charged. The metal charger plug and the probe tube respectively serve as a positive pole and a negative pole of the charging circuit. The built-in rechargeable battery is charged via the PCB, which is wired charging. After long-term use, the metal charger plug and the probe tube have poor contact with the charging socket, which results in poor or no charging effect. This needs to be improved.

SUMMARY

In order to solve the technical problems of poor contact and poor charging effect in the existing Bluetooth temperature probe, by which a wired charging mode is used, the present application provides a temperature probe.

The temperature probe of the present application includes a probe tube, a handle, a PCB, a rechargeable battery and a wireless charging coil, the handle is connected to the probe tube in a sealing manner, the handle is configured with a first inner cavity, the probe tube is configured with a second inner cavity in communication with the first inner cavity, the rechargeable battery is electrically connected to the PCB, the PCB is arranged in the second inner cavity, and the wireless charging coil is arranged in the first inner cavity and is electrically connected to the PCB, so as to charge the rechargeable battery.

A wireless charging coil is arranged within the temperature probe of the application, so that the rechargeable battery can be charged wirelessly via an external wireless charging socket. Since the probe tube and a metal charger plug are no longer used, there is no more problem about the wear of the charging interface and therefore no bad charging effect due to poor contact. The present temperature probe is no longer easily damaged, which is more convenient for charging, and which is full of science and technology.

Optionally, a pipe clamp with an external thread is further welded at a proximal end of the probe tube, and the handle is screwed to the pipe clamp, or that a pipe clamp with an internal thread is further welded at the proximal end of the probe tube, the handle is correspondingly provided with an external thread, and the handle is screwed to the pipe clamp.

As a result, the tightness between the probe tube and the handle is improved, and thus a better watertightness can be achieved.

Optionally, the temperature probe further includes a lock nut and a pipe clamp, two ends of the pipe clamp are each provided with an external thread, the handle is screwed to the pipe clamp, a fastening ring is welded at a proximal end of the probe tube, the lock nut is also screwed to the pipe clamp, a distal end of the lock nut is provided with a stop ring, and the stop ring abuts against an end face of the fastening ring.

This improves the connection strength between the probe tube and the handle and also improves the tightness.

Optionally, the temperature probe includes a food temperature sensor at a distal end of the second inner cavity and an ambient temperature sensor at a proximal end of the first inner cavity, not only the food temperature sensor but also the ambient temperature sensor are electrically connected to the PCB, the wireless charging coil includes a coil body and a magnetic core, the coil body is wound around the magnetic core and electrically connected to the PCB via a charging cable, the magnetic core is configured with a central hole, a first ceramic tube is further sleeved on a proximal section of a lead wire of the ambient temperature sensor and passes through the central hole, the first ceramic tube is configured to separate the lead wire of the ambient temperature sensor from the magnetic core, and a second ceramic tube is sleeved on a distal section of the lead wire of the ambient temperature sensor for thermal insulation.

Optionally, the coil body also acts as an antenna of the temperature probe, and a copper tube for increasing antenna gain is sleeved on the charging cable.

Based on this implementation, no separate antenna is provided in this application, so that the number of components is reduced and administration is therefore simplified.

Optionally, a third ceramic tube is sleeved on the charging cable, and the copper tube for increasing antenna gain is sleeved outside the third ceramic tube.

Optionally, the second ceramic tube is also located in the copper tube for increasing antenna gain.

Optionally, the temperature probe further includes an antenna, the antenna is configured as a spiral antenna and disposed in the first inner cavity, a lead wire of the antenna is electrically connected to the PCB after passing through the central hole of the wireless charging coil, and a fourth ceramic tube is sleeved on the lead wire of the antenna.

Optionally, the temperature probe further includes an antenna, the antenna is configured as a metallic loop antenna and disposed in the first inner cavity, a lead wire of the antenna is electrically connected to the PCB after passing through the central hole of the wireless charging coil, a fourth ceramic tube is sleeved on the lead wire of the antenna, and a metal cap which is electrically connected to the metal loop antenna is further provided at a proximal end of the handle.

Optionally, the coil body and the magnetic core are both square in cross section, an outer circumferential surface of the handle is provided with at least two charging planes parallel to each other, and the at least two charging planes are parallel to two side surfaces of the square coil body.

Based on this implementation, the coil body cooperates with an external transmitting coil, so that the power receiving area is large and the charging efficiency is higher.

In summary, at least one of the following advantageous technical effects has been achieved.

1. A wireless charging coil is arranged within the temperature probe of the application, so that the rechargeable battery can be wirelessly charged via an external wireless charging socket, so that the charging is more convenient, and a strong sense of science and technology can be obtained.

2. No separate antenna may be provided in this application, so that the number of components is reduced and administration is simplified.

3. The coil body cooperates with an external transmitting coil, so that the power receiving area is large and the charging efficiency is higher.

DETAILED EMBODIMENTS

Figure 1:
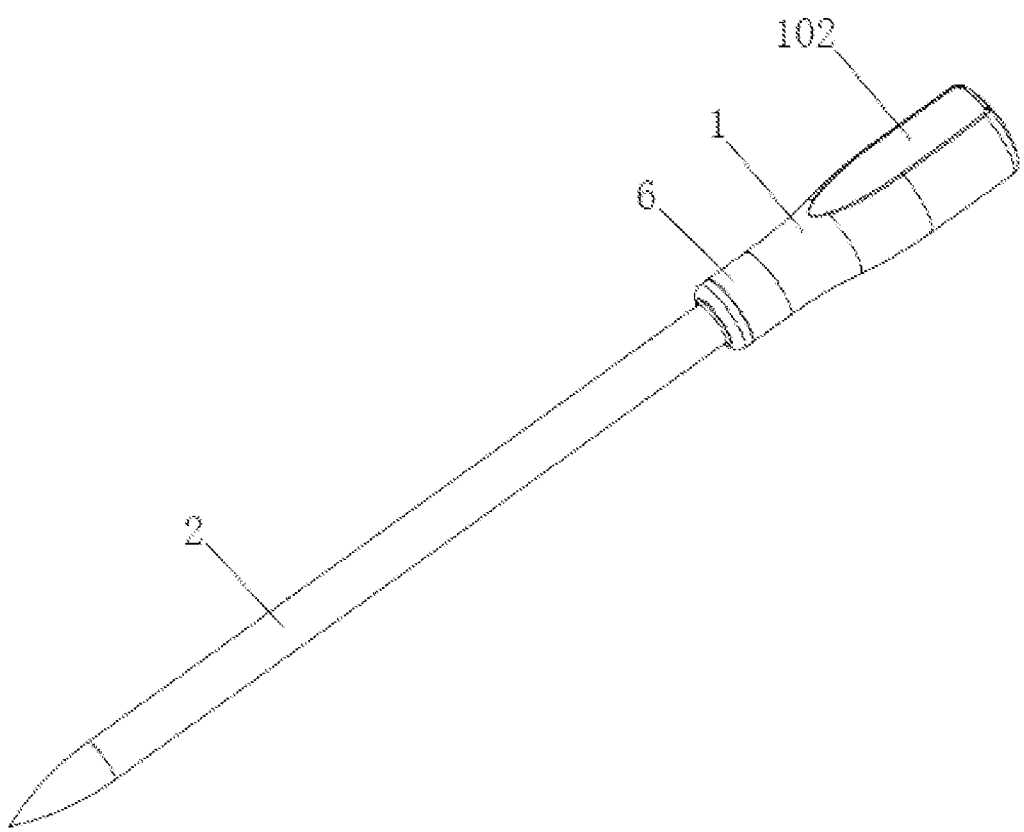
FIG. 1 is a perspective view of the temperature probe according to Embodiment 1 of the application.

The present application is described in more detail below in combination with FIGS. 1-16.

Embodiment 1

Referring to FIG. 1 to FIG. 4, an embodiment of the application discloses a temperature probe including a probe tube 2, a handle 1, a PCB 3, a rechargeable battery 4 and a wireless charging coil 5, the handle 1 is fixedly connected to the probe tube 2 in a sealing manner. A first inner cavity 101 is defined within the handle 1, and a second inner cavity 21 is defined within the probe tube 2, the first inner cavity 101 is in communication with the second inner cavity 21. The rechargeable battery 4 is electrically connected to the PCB 3, the PCB 3 is arranged in the second inner cavity 21, while the wireless charging coil 5 is arranged in the first inner cavity 101 and is electrically connected to the PCB 3 for charging the rechargeable battery.

Figure 2:
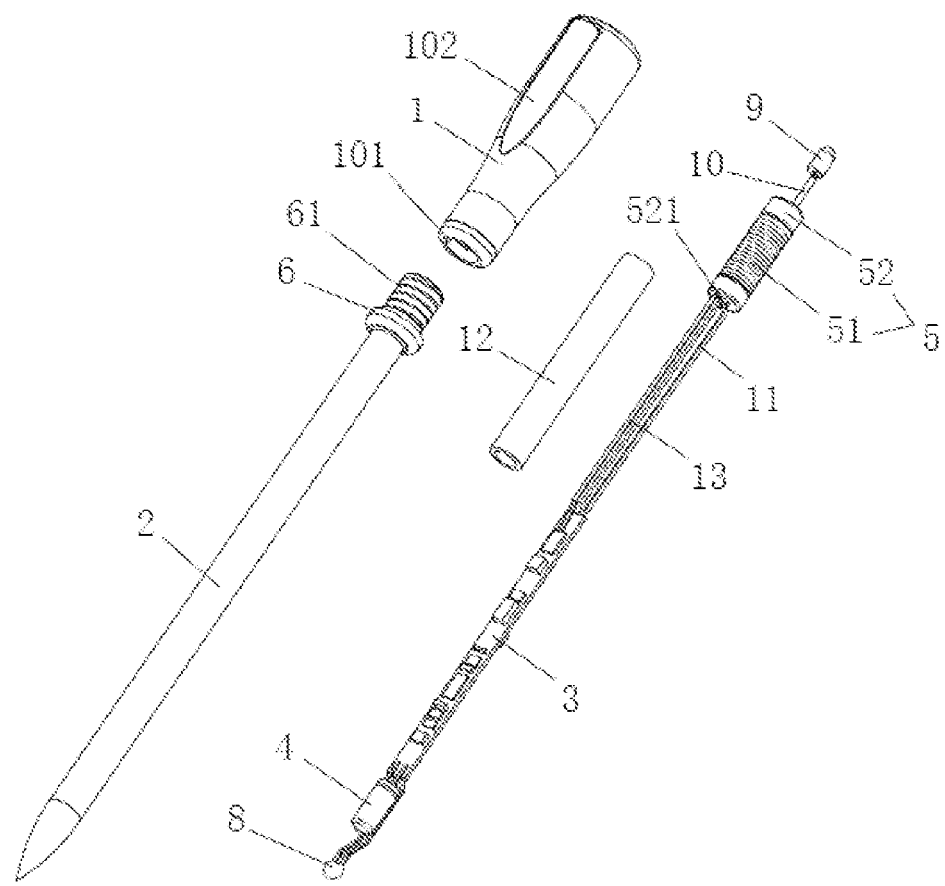
FIG. 2 is a schematic exploded view of the temperature probe according to Embodiment 1 of the application.
Figure 3:
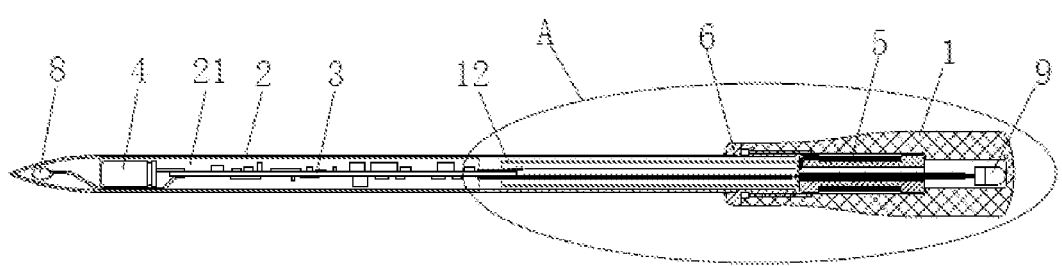
FIG. 3 is a schematic half-sectional view of the temperature probe according to Embodiment 1 of the application.
Figure 4:
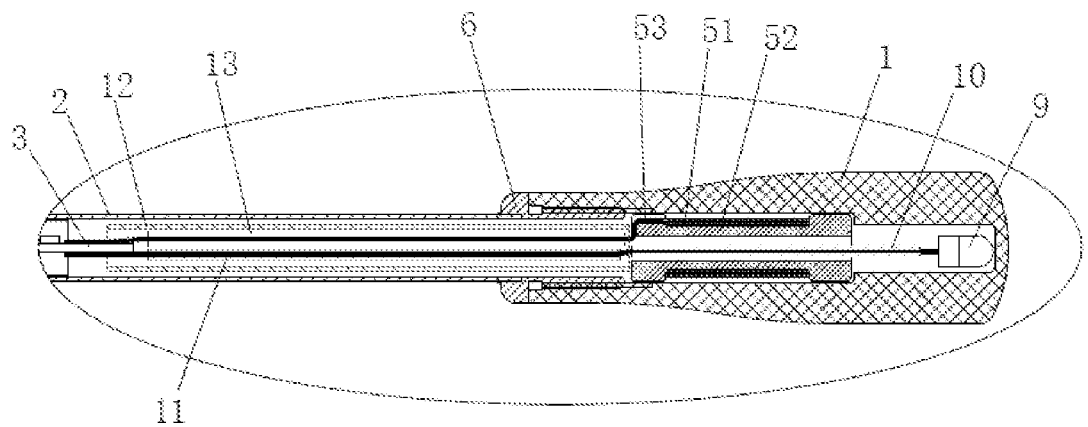
FIG. 4 is an enlarged view of part A in FIG. 3.

Referring to FIG. 2 and FIG. 4, a pipe clamp 6 is welded at the proximal end of the probe tube 2. The pipe clamp 6 is completely sealed against the probe tube 2 by girth welding. The pipe clamp 6 is provided with an external thread. The handle 1 is screwed to the pipe clamp 6, and a sealing ring, if necessary, is arranged between them to strengthen the sealing effect, so that a better watertightness can be achieved.

Referring to FIG. 2, the temperature probe includes a food temperature sensor 8 and an ambient temperature sensor 9, both the food temperature sensor 8 and the ambient temperature sensor 9 are electrically connected to the PCB 3. The food temperature sensor 8 is disposed at the distal end (at the tip) of the second inner cavity 21, so as to detect the temperature of the food. This gives the highest measurement accuracy, because the distal end, where the food temperature sensor is located, is closest to the food. The ambient temperature sensor 9 is located at the proximal end of the first inner cavity 101, which is furthest from the tip of the probe tube 2, where it is the least influenced by the temperature of the food, which means the measured ambient temperature is most accurate, because the temperature of the location, where the ambient temperature sensor is located, is as close as possible to the ambient temperature. After the ambient temperature is measured, the measured temperature of the food can be compensated in terms of temperature, so that a more accurate temperature can be ultimately obtained.

Referring to FIG. 4, the wireless charging coil 5 includes a coil body 51 and a magnetic core 52, the coil body 51 is wound around the magnetic core 52 and electrically connected to the PCB 3 via the charging cable 53, the magnetic core 52 is configured with a central hole 521. A first ceramic tube 10 is further sleeved on the front section of a lead wire of the ambient temperature sensor 9 and passes through the central hole 521, and in particular, the first ceramic tube 10 is configured in such a way, that the lead wire of the ambient temperature sensor 9 is separated from the magnetic core 52. A second ceramic tube 11 is sleeved on the rear section of the lead wire of the ambient temperature sensor 9 for thermal insulation, so as to reduce the influence of the temperature of the probe tube 2 on the lead wire of the ambient temperature sensor 9, thereby reducing the influence of the temperature of the lead wire of the ambient temperature sensor 9 on the measurement of the ambient temperature. The wireless charging coil 5 here is a receiving coil for wireless charging and for charging must work together with an external transmitter coil for wireless charging. Since the lead wire of the ambient temperature sensor 9 is very long and has a relatively small diameter, ideally only one ceramic tube is needed to protect the lead wire. However, the ceramic tube is thin and long, which is difficult to manufacture. Therefore, two ceramic tubes, namely the first ceramic tube 10 and the second ceramic tube 11 are used in the present application to protect the lead wire, so as to simplify the manufacturing.

Referring to FIG. 4, the coil body 51 also acts as the antenna 15 in the temperature probe. The temperature probe will not be charged when it turned on for temperature measurement and will not measure the temperature when being turned off for charging. Therefore, there are no conflicts regarding the usage time of the coil body 51, so that the coil body can serve as the antenna 15, too. The coil body 51 is a copper wire coil made of the same material as the ordinary antenna 15. Therefore, it can also apply to the antenna 15 in terms of material and performance, so that the coil body, which is a metal component, is fully utilized. In order to improve the effect of the antenna 15, a copper tube for increasing antenna gain 12 can be sleeved on the charging cable. No separate antenna 15 is provided in the application, so that the number of components is reduced and administration is therefore simplified. The probe tube 2 is generally made of stainless steel and the handle 1 is generally made of zirconium oxide. Stainless steel has a good shielding effect on the signals of the antenna 15, while zirconium oxide has a poor shielding effect on the signals of the antenna 15. Since the coil body 51 is arranged in the first inner cavity 101, the transmission and reception of the signals of the antenna 15 is less influenced.

Referring to FIG. 4, the third ceramic tube 13 is sleeved on the charging cable 53, and the copper tube for increasing antenna gain 12 is in turn sleeve on the third ceramic tube 13. The third ceramic tube 13 can play not only an insulating role but also a heat-insulating role. In addition, the copper tube for increasing antenna gain 12, the charging cable 53 and the third ceramic tube 13 together form a coaxial cable which has strong anti-interference ability, and by which signals can be transmitted stably.

Referring to FIG. 4, the second ceramic tube 11 is also located in the copper tube for increasing antenna gain 12. The copper tube for increasing antenna gain 12 has a larger diameter, so that it can be easily penetrated.

In the application, a wireless charging coil 5 is arranged within the temperature probe, through which the rechargeable battery 4 can be charged wirelessly via an external wireless charging socket. Since the probe tube 2 and a metal charger plug are no longer used, there is no more problem about the wear of the charging interface and therefore no bad charging effect due to poor contact. The present temperature probe is no longer easily damaged, which is more convenient for charging, and which is full of science and technology.

Embodiment 2

Figure 5:
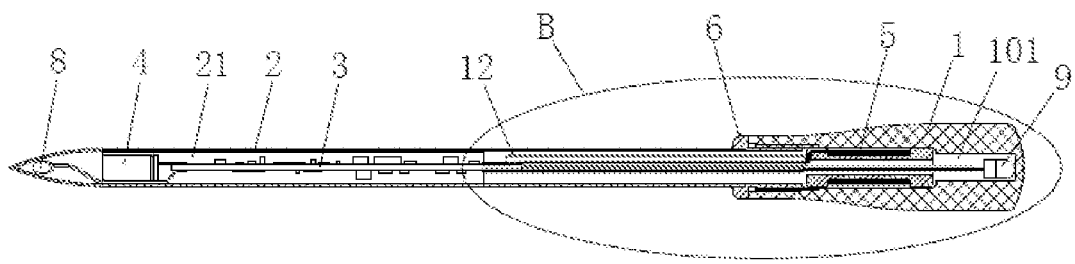
FIG. 5 is a schematic half-sectional view of the temperature probe according to Embodiment 2 of the application.
Figure 6:
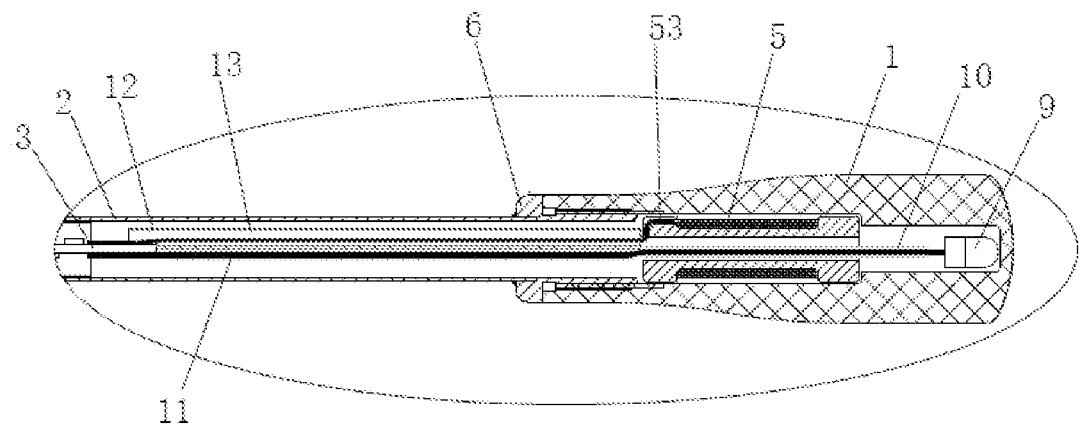
FIG. 6 is an enlarged view of part B in FIG. 5.

Referring to FIG. 5 and FIG. 6, the present embodiment differs from Embodiment 1 in that the second ceramic tube 11 is located outside the copper tube for increasing antenna gain 12, the copper tube for increasing antenna gain 12 is only sleeved on the third ceramic tube 13 and the charging cable 53. The copper tube for increasing antenna gain 12 has a smaller diameter, so that it is not easy to be penetrated, but it can be manufactured in a material-saving manner and is therefore cost-effective. Other structures and advantageous effects are the same as Embodiment 1 and will here not be described again.

Embodiment 3

Figure 7:
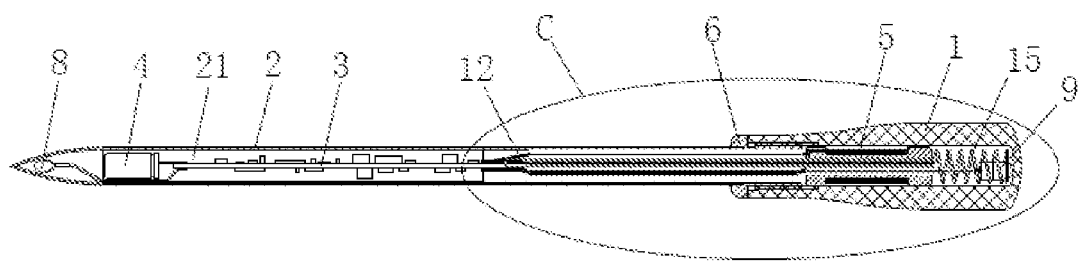
FIG. 7 is a schematic half-sectional view of the temperature probe according to Embodiment 3 of the application.
Figure 8:
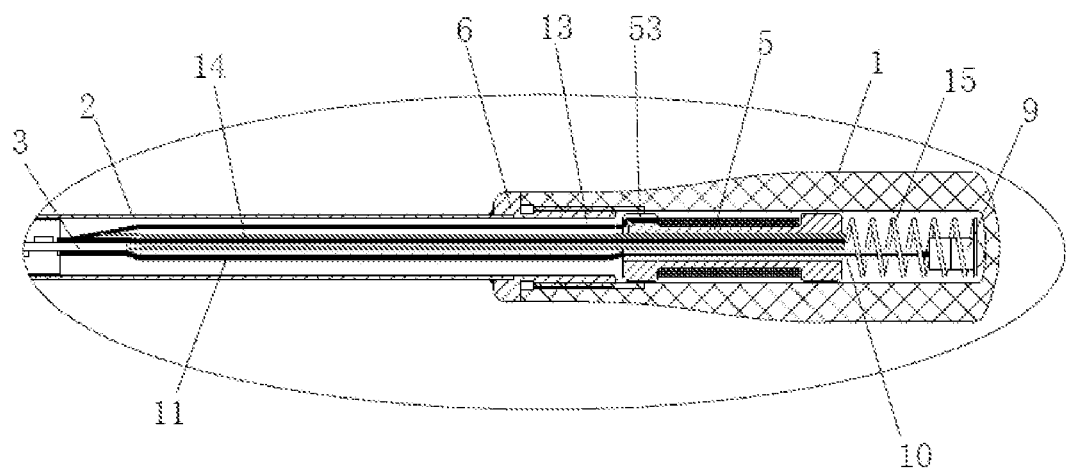
FIG. 8 is an enlarged view of part C in FIG. 7.

Referring to FIG. 7 and FIG. 8, the present embodiment differs from Embodiment 1 in a separate antenna 15. The temperature probe further includes an antenna 15. The antenna 15 is a spiral antenna and is arranged in the first inner cavity 101, the lead wire of the antenna 15 is electrically connected to the PCB 3 after passing through the central hole 521 of the wireless charging coil 5. A fourth ceramic tube 14 is further sleeved on the lead wire of the antenna 15. The fourth ceramic tube 14 can also be formed in sections to reduce manufacturing costs. The copper tube for increasing antenna gain 12 is sleeved on the fourth ceramic tube 14 to improve the reception and transmission of signals of the antenna 15. Other structures and advantageous effects are the same as Embodiment 1 and will here not be described again.

Embodiment 4

Figure 9:
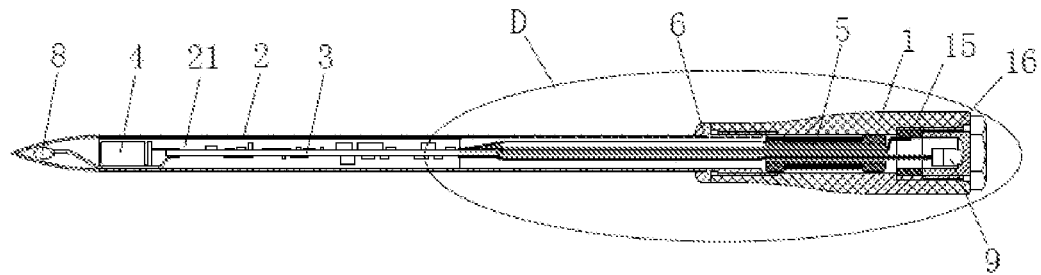
FIG. 9 is a schematic half-sectional view of the temperature probe according to Embodiment 4 of the application.
Figure 10:
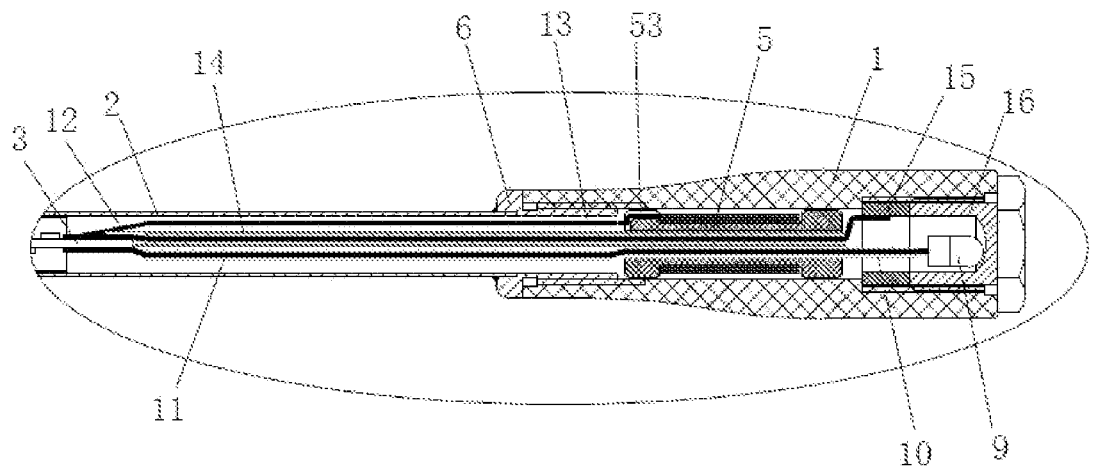
FIG. 10 is an enlarged view of part D in FIG. 9.

Referring to FIG. 9 and FIG. 10, the present embodiment differs from Embodiment 3 in the structure of the antenna 15. The antenna 15 is a metallic loop antenna and is arranged in the first inner cavity 101, the lead wire of the antenna 15 is electrically connected to the PCB 3 after passing through the central hole 521 of the wireless charging coil 5, and a fourth ceramic tube 14 and the copper tube for increasing antenna gain 12 are sleeved on the lead wire of the antenna 15. A metal cap 16 is also provided at the proximal end of the handle 1. The metal cap 16 is electrically connected to the metal loop antenna 15 to improve the reception and transmission of the signals of the antenna 15. Other structures and advantageous effects are the same as Embodiment 3 and will here not be described again.

Embodiment 5

Figure 11:
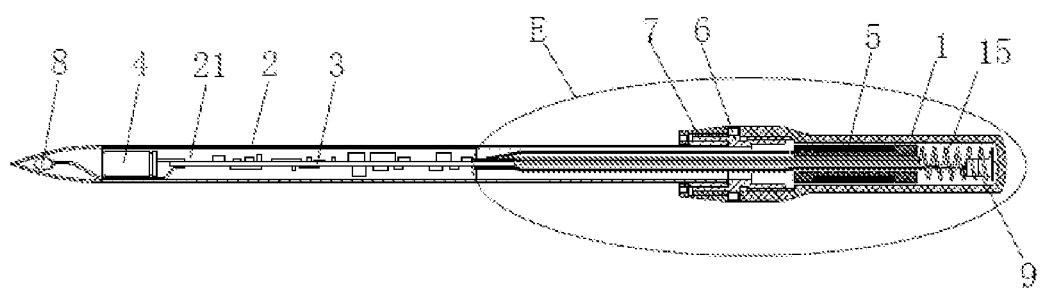
FIG. 11 is a schematic half-sectional view of the temperature probe according to Embodiment 5 of the application.
Figure 12:
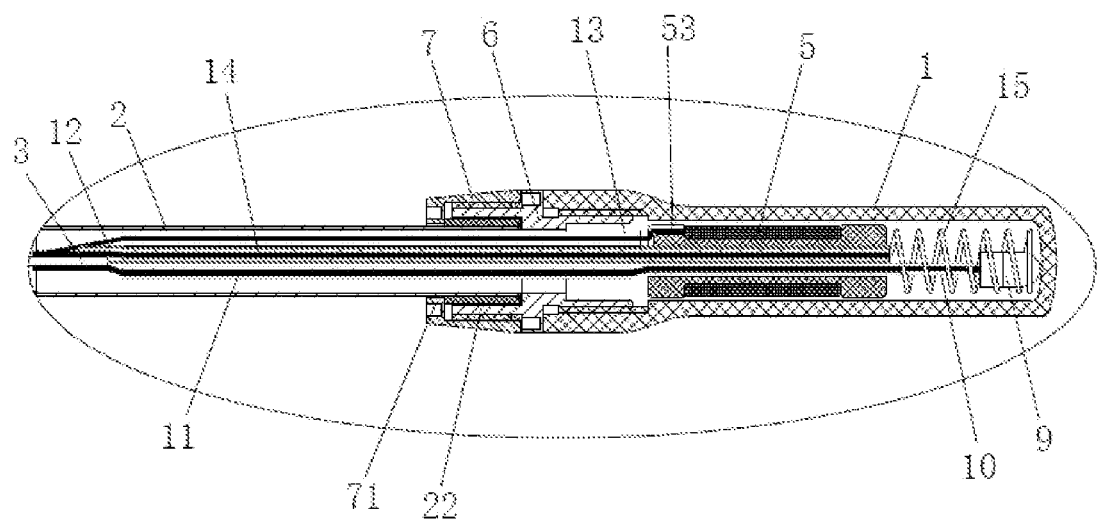
FIG. 12 is an enlarged view of part E in FIG. 11.

Referring to FIG. 11 and FIG. 12, the internal structure thereof is absolutely the same as that of Embodiment 3, except the shape of the pipe clamp 6. The temperature probe also includes a pipe clamp 6 and a lock nut 7, two ends of the pipe clamp 6 are each provided with an external thread, the handle 1 is screwed to the pipe clamp 6. A fastening ring 22 is welded at the proximal end of the probe tube 2, and the lock nut 7 is also screwed to the pipe clamp 6. A stop ring 71 is provided at the distal end of the lock nut 7. The stop ring 71 abuts against the end face of the fastening ring 22. In this way, the connection strength and the tightness between the probe tube 2 and the handle 1 is improved. Other structures and advantageous effects are the same as Embodiment 3 and will here not be described again.

Embodiment 6

Figure 13:
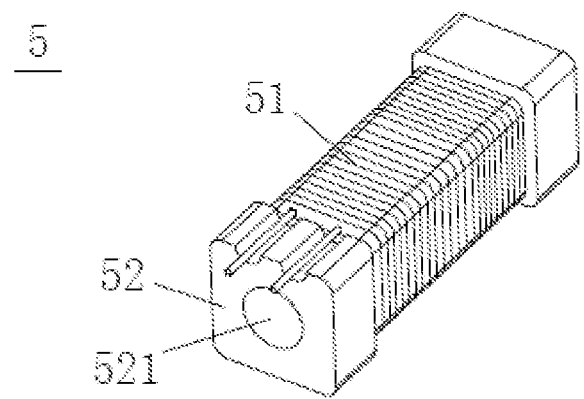
FIG. 13 is a perspective view of the wireless charging coil according to Embodiment 6 of the application.
Figure 14:
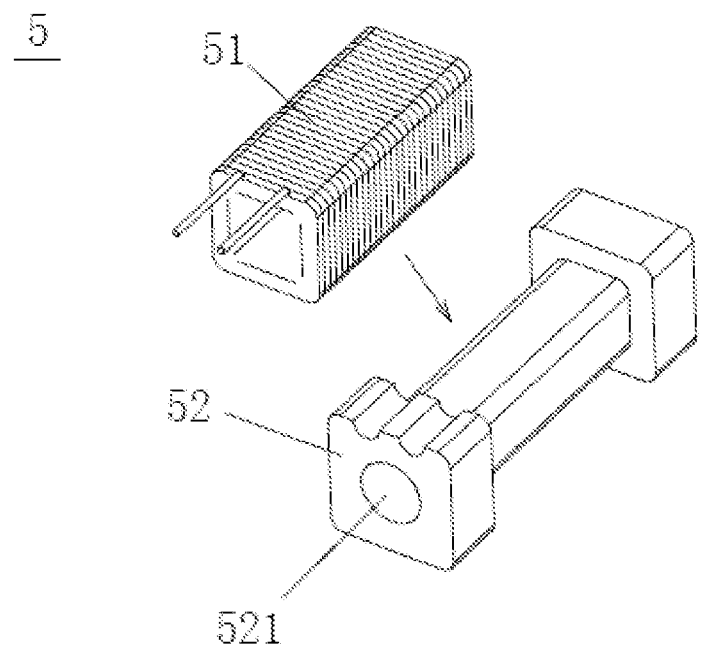
FIG. 14 is a schematic exploded view of the wireless charging coil according to Embodiment 5 of the application.

Referring to FIG. 13 and FIG. 14, the present embodiment differs from Embodiment 1 in that the coil body 51 and the magnetic core 52 are square in cross section, and that the outer circumferential surface of the handle 1 is provided with at least two charging planes 102 parallel to each another. The charging planes 102 are parallel to two side surfaces of the square coil body 51. The coil body 51 cooperates with the external transmitter coil, such that the power receiving area is large and the charging efficiency is therefore higher.

Embodiment 7

Figure 15:
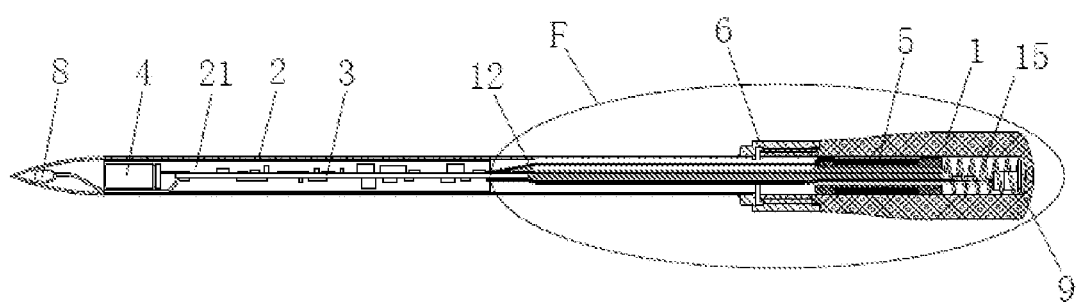
FIG. 15 is a schematic half-sectional view of the temperature probe according to Embodiment 5 of the application.
Figure 16:
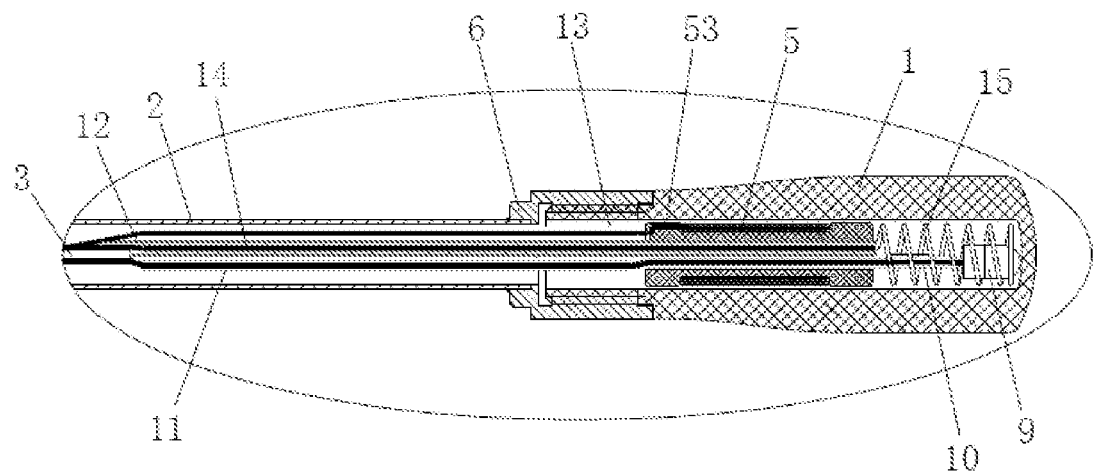
FIG. 16 is an enlarged view of part F in FIG. 15.

Referring to FIG. 15 and FIG. 16, the internal structure thereof is absolutely the same as that of Embodiment 3, except the shape of the pipe clamp 6. In general, the probe tube 2 and the pipe clamp 6 are made of stainless steel while the handle 1 is made of zirconium oxide. The thermal expansion coefficient of zirconium oxide is greater than that of stainless steel. In case that the temperature of the temperature probe is higher under certain circumstances, for example above 300° C., the structure in Embodiment 3 leads to an increased gap between the internal thread and the external thread, since the thermal expansion of the internal thread of the handle 1 is greater than that of the external thread of the pipe clamp 6, which leads to a poor sealing effect. Referring to FIGS. 15 and 16, Embodiment 7 of the temperature probe also differs from embodiment 3 in the sealing connection between the probe tube 2 and the handle 1. In particular, also a pipe clamp 6 is welded at the proximal end of the probe tube 2, the pipe clamp 6 is provided with an internal thread and the handle 1 is correspondingly provided with an external thread. The handle 1 is screwed to the pipe clamp 6. Since after modifying the structure, the thermal expansion of the external thread of the handle 1 is still greater than that of the internal thread of the pipe clamp 6, the internal thread and external threads are closer to each other, so that the sealing effect would not be deteriorated at high temperatures.

The foregoing descriptions represent the preferred embodiments of the present application and are not intended to limit the scope of the present application, so that all equivalent changes made based on the structure, form and principle of the present application fall within the scope of the present application.

LIST OF REFERENCE SIGNS 1 handle
101 first inner cavity
102 charging plane
2 probe tube
21 second inner cavity
22 fastening ring
3 PCB
4 rechargeable battery
5 wireless charging coil
51 coil body
52 magnetic core
521 central hole
53 charging cable
6 pipe clamp
7 lock nut
71 stop ring
8. food temperature sensor
9. ambient temperature sensor
10 first ceramic tube
11 second ceramic tube
12 copper tube for increasing antenna gain
13 third ceramic tube
14 fourth ceramic tube
15 antenna
16 metal cap

What is claimed is:

1. A temperature probe, comprising a probe tube, a handle, a printed circuit board (PCB), a rechargeable battery and a wireless charging coil, wherein the handle is connected to the probe tube in a sealing manner, the handle is configured with a first inner cavity, the probe tube is configured with a second inner cavity in communication with the first inner cavity, the rechargeable battery is electrically connected to the PCB, the PCB is arranged in the second inner cavity, and the wireless charging coil is arranged in the first inner cavity and is electrically connected to the PCB, so as to charge the rechargeable battery,
the temperature probe further comprising a food temperature sensor at a distal end of the second inner cavity and an ambient temperature sensor at a proximal end of the first inner cavity, wherein the food temperature sensor and the ambient temperature sensor are electrically connected to the PCB, the wireless charging coil comprises a coil body and a magnetic core, the coil body is wound around the magnetic core and electrically connected to the PCB via a charging cable, the magnetic core is configured with a central hole, a first ceramic tube is further sleeved on a proximal section of a lead wire of the ambient temperature sensor and passes through the central hole, the first ceramic tube is configured to separate the lead wire of the ambient temperature sensor from the magnetic core, and a second ceramic tube is sleeved on a distal section of the lead wire of the ambient temperature sensor for thermal insulation.

2. The temperature probe according to claim 1, wherein a pipe clamp with an external thread is further welded at a proximal end of the probe tube, and the handle is screwed to the pipe clamp with the external thread, or
a pipe clamp with an internal thread is further welded at the proximal end of the probe tube, the handle is correspondingly provided with an external thread, and the handle is screwed to the pipe clamp with the internal thread.

3. The temperature probe according to claim 1, further comprising a lock nut and a pipe clamp, two ends of the pipe clamp are each provided with an external thread, wherein the handle is screwed to the pipe clamp, a fastening ring is welded at a proximal end of the probe tube, the lock nut is also screwed to the pipe clamp, a distal end of the lock nut is provided with a stop ring, and the stop ring abuts against an end face of the fastening ring.

4. The temperature probe according to claim 1, wherein the coil body acts as an antenna of the temperature probe, and a copper tube for increasing antenna gain is sleeved on the charging cable.

5. The temperature probe according to claim 4, wherein a third ceramic tube is sleeved on the charging cable, and the copper tube for increasing antenna gain is sleeved outside the third ceramic tube.

6. The temperature probe according to claim 5, wherein the second ceramic tube is also located in the copper tube for increasing antenna gain.

7. The temperature probe according to claim 1, further comprising an antenna, wherein the antenna is configured as a spiral antenna and disposed in the first inner cavity, a lead wire of the antenna is electrically connected to the PCB after passing through the central hole of the magnetic core, and a fourth ceramic tube is sleeved on the lead wire of the antenna.

8. The temperature probe according to claim 1, further comprising an antenna, wherein the antenna is configured as a metallic loop antenna and disposed in the first inner cavity, a lead wire of the antenna is electrically connected to the PCB after passing through the central hole of the magnetic core, a fourth ceramic tube is sleeved on the lead wire of the antenna, and a metal cap which is electrically connected to the metallic loop antenna is further provided at a proximal end of the handle.

9. The temperature probe according to claim 1, wherein the coil body and the magnetic core are both square in cross section, an outer circumferential surface of the handle is provided with at least two charging planes parallel to each other, and the at least two charging planes are parallel to two side surfaces of the coil body.

\* \* \* \* \*